(12) United States Patent
Yamaguchi et al.

(10) Patent No.: US 10,186,355 B2
(45) Date of Patent: Jan. 22, 2019

(54) THERMISTOR ELEMENT AND MANUFACTURING METHOD THEREFOR

(71) Applicant: NGK SPARK PLUG CO., LTD., Nagoya-shi, Aichi (JP)

(72) Inventors: Tomoki Yamaguchi, Anjo (JP); Shinji Ban, Aichi (JP); Hiroshi Watanabe, Nagoya (JP); Yasuyuki Okimura, Inuyama (JP); Hiroaki Nakanishi, Kasugai (JP); Seiji Oya, Aichi (JP); Seiya Matsuda, Komaki (JP)

(73) Assignee: NGK SPARK PLUG CO., LTD., Nagoya-shi, Aichi (JP)

( * ) Notice: Subject to any disclaimer, the term of this patent is extended or adjusted under 35 U.S.C. 154(b) by 0 days.

(21) Appl. No.: 15/485,355

(22) Filed: Apr. 12, 2017

(65) Prior Publication Data

US 2017/0301437 A1 Oct. 19, 2017

(30) Foreign Application Priority Data

Apr. 13, 2016 (JP) ................. 2016-080564

(51) Int. Cl.
| | |
|---|---|
| H01C 1/14 | (2006.01) |
| H01C 7/00 | (2006.01) |
| H01C 17/22 | (2006.01) |
| G01K 7/22 | (2006.01) |
| H01C 17/24 | (2006.01) |

(52) U.S. Cl.
CPC ............. *H01C 7/008* (2013.01); *G01K 7/22* (2013.01); *H01C 1/14* (2013.01); *H01C 17/22* (2013.01); *H01C 17/24* (2013.01)

(58) Field of Classification Search
CPC ........... H01C 7/008; H01C 1/14; H01C 17/22
USPC ........................................ 338/22 R
See application file for complete search history.

(56) References Cited

U.S. PATENT DOCUMENTS

| | | | | |
|---|---|---|---|---|
| 3,430,336 A | * | 3/1969 | Riddel ............ | H01C 17/02 257/690 |
| 4,151,401 A | * | 4/1979 | Van Bokestal ........ | H01C 7/022 219/508 |
| 4,200,970 A | * | 5/1980 | Schonberger ........ | H01C 17/232 29/593 |
| 4,434,416 A | * | 2/1984 | Schonberger .......... | G01K 7/223 219/121.67 |
| 5,190,697 A | * | 3/1993 | Ohkita .................... | C08K 3/04 252/500 |
| 5,537,286 A | * | 7/1996 | Gozlan .................. | H01C 7/027 29/612 |
| 5,749,656 A | * | 5/1998 | Boehm .................... | G01K 7/22 338/28 |

(Continued)

FOREIGN PATENT DOCUMENTS

JP 5053563 B2 10/2012

*Primary Examiner* — Kyung S Lee
(74) *Attorney, Agent, or Firm* — Sughrue Mion, PLLC

(57) ABSTRACT

In a manufacturing method for a thermistor element (3) including: a thermistor portion (49) which is a sintered body formed from a thermistor material; and a pair of electrode wires (25) which are embedded in the thermistor portion (49) and at least one end portion of each of the electrode wires projects at an outer side of the thermistor portion (49), the resistance value of the thermistor element (3) is adjusted by performing a removal processing of removing a part of the thermistor portion (49).

15 Claims, 11 Drawing Sheets

(56) References Cited

U.S. PATENT DOCUMENTS

| | | | |
|---|---|---|---|
| 7,656,269 B2* | 2/2010 | Mizoguchi | C01G 45/125 |
| | | | 252/500 |
| 9,076,576 B2* | 7/2015 | Saito | H01C 7/008 |
| 2009/0016409 A1 | 1/2009 | Mizoguchi et al. | |

* cited by examiner

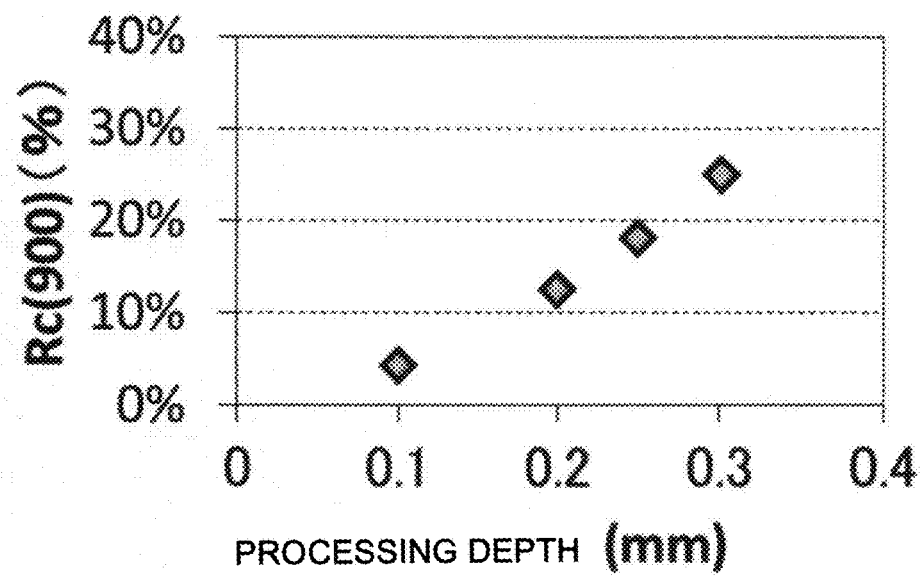
FIG. 4
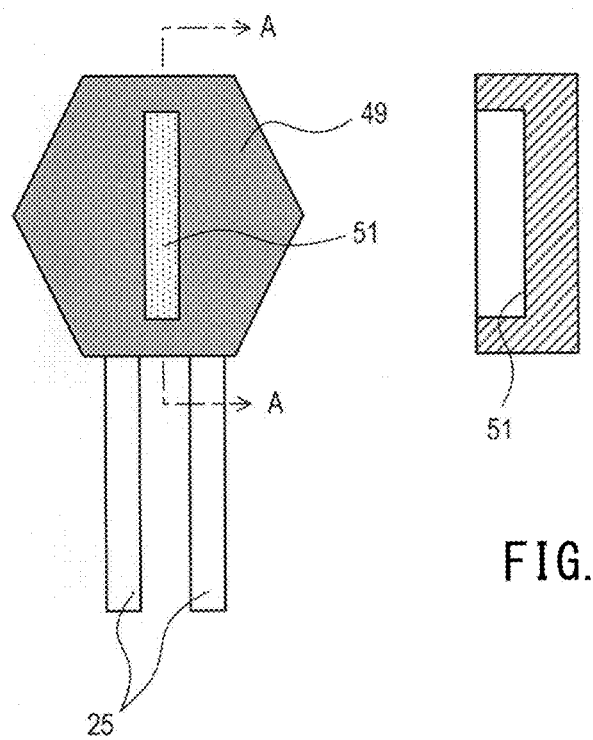
FIG. 5B
FIG. 5A

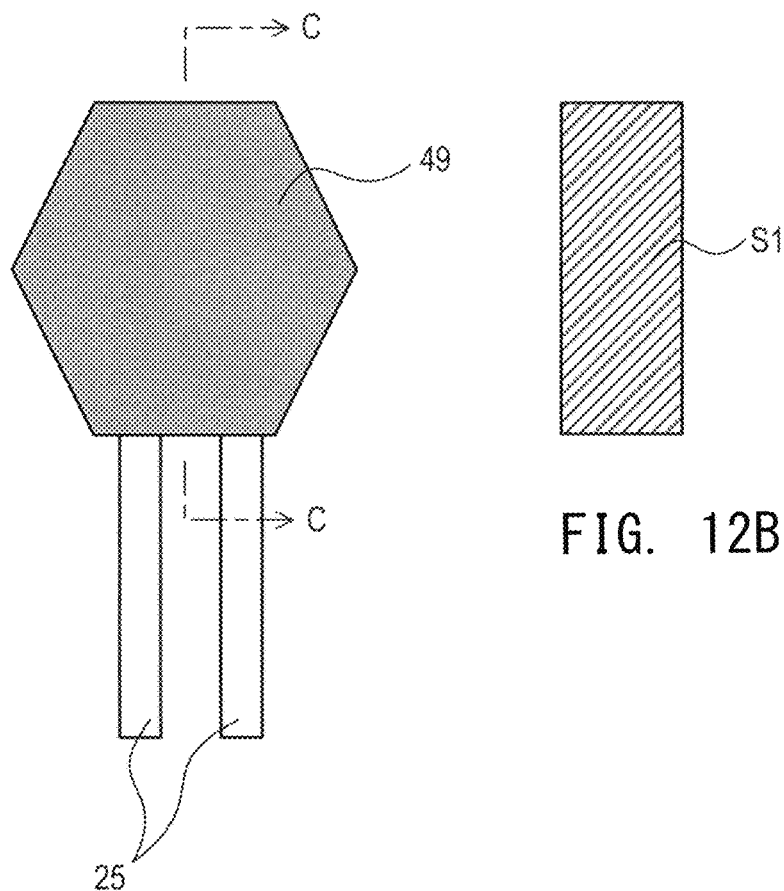
FIG. 12A
FIG. 12B
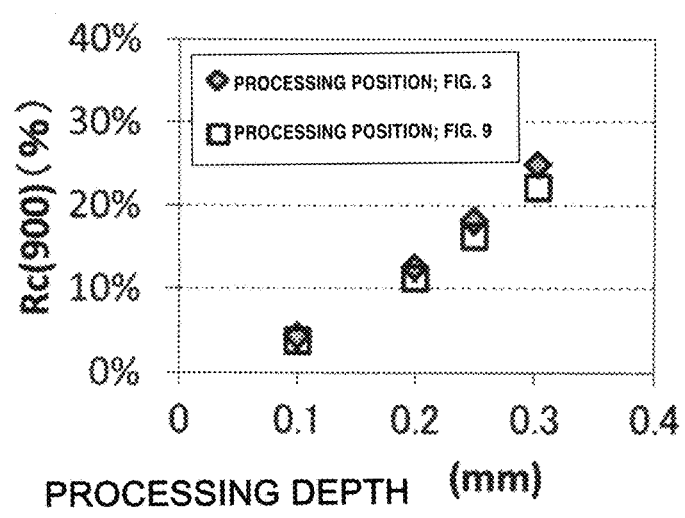
FIG. 13

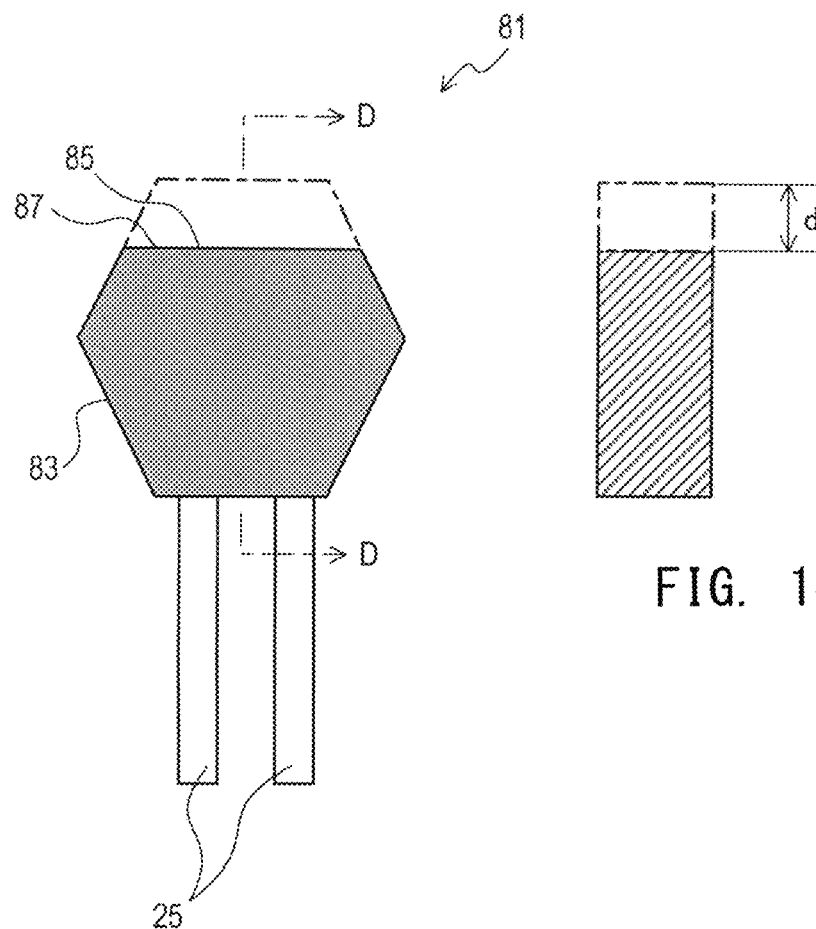
FIG. 14B
FIG. 14A
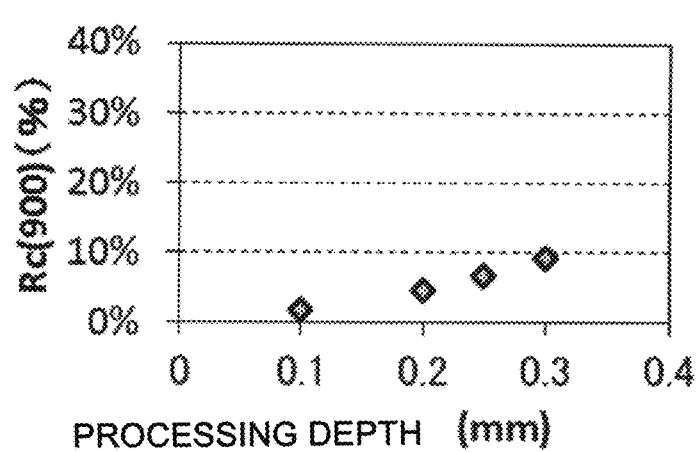
FIG. 15

THERMISTOR ELEMENT AND MANUFACTURING METHOD THEREFOR

BACKGROUND OF THE INVENTION

1. Field of the Invention

The present invention relates to a thermistor element which is used, for example, in a temperature sensor, and a manufacturing method therefor.

2. Description of the Related Art

Conventionally, a thermistor element has been known in which end portions of a pair of electrode wires are embedded in a thermistor portion whose resistance value changes in response to temperature and which is composed of a conductive oxide sintered body (see Patent Document 1).

An example application of the thermistor element is a temperature sensor for measuring the temperature of exhaust gas of an automobile. In this application, for example, there is a need to accurately detect a temperature in a wide temperature range of −40° C. to 1000° C.

In addition, the thermistor element is manufactured by: producing a molded product through press-forming with a mold; and baking the molded product. Thus, the manufacturing is easy, and the manufacturing cost is low. Therefore, the thermistor element has been widely used.

[Patent Document 1] Japanese Patent No. 5053563

3. Problems to be Solved by the Invention

However, as to the thermistor element, the thermistor portion is formed into a predetermined shape and then baked into a sintered body. Thus, there is a problem in that there is great variation in the resistance values of individual thermistor elements.

Moreover, there is no method for adjusting the resistance value of a thermistor element after the thermistor element is manufactured through baking. Thus, the development of a technique of adjusting the resistance value has been desired.

SUMMARY OF THE INVENTION

The present invention has been made in view of the above circumstances, and an object thereof is to provide a thermistor element whose resistance value is adjustable after baking, and a manufacturing method therefor.

The above object has been achieved, in a first aspect of the present invention, by providing (1) a method for manufacturing a thermistor element, the thermistor element including: a thermistor portion which is a sintered body formed from a thermistor material; and a pair of electrode wires which are embedded in the thermistor portion and at least one end portion of each of the electrode wires projects at an outer side of the thermistor portion.

In the first aspect (1), the manufacturing method comprising adjusting a resistance value of the thermistor element by performing a removal processing of removing a part of the thermistor portion which is the sintered body. Thus, even when the resistance values among individual thermistor elements vary, the resistance value can easily be made to approach a target resistance value. For example, it is also possible to adjust the resistance value so as to assume a target value.

The reason why the resistance value can be adjusted by the removal processing is that by removing a part of the sintered body, a conduction path between the pair of electrode wires changes. In addition, a change in the resistance value occurs due to a change in the conduction path, and thus the B-constant (temperature gradient coefficient) does not change. Accordingly, an advantage is that a desired resistance value can be achieved without changing the B-constant of the thermistor element.

As described above, in the first aspect (1), since it is possible to adjust the resistance value of the thermistor element after baking, variations in resistance value can be greatly reduced. Thus, a significant effect of enabling the thermistor element to detect a temperature in a wide range with high accuracy can be achieved.

In a preferred embodiment (2) of the manufacturing method (1) above, a correlation between a range of a portion to be removed by the removal processing and a change in the resistance value of the thermistor element before and after adjustment is obtained in advance, and the resistance value of the thermistor element is adjusted to a target resistance value by performing the removal processing based on the correlation.

According to research of the present inventors, etc., a range of a portion to be removed by the removal processing correlates to a change in the resistance value of the thermistor element before and after adjustment. Thus, the correlation is obtained in advance, a portion to be removed is set based on the correlation and the removal processing is performed, whereby the resistance value of the thermistor element can readily be adjusted to the target resistance value.

For example, in the case of measuring a resistance value before adjustment and changing the resistance value by a predetermined value, a range of a portion to be removed is determined based on the correlation. Thus, by removal within this range, the resistance value can be made to approach the target resistance value.

In another preferred embodiment (3), the manufacturing method (2) above comprises: a first step of measuring the resistance value of the thermistor element; a second step of calculating an index indicating the change in the resistance value before and after adjustment, based on a difference between the resistance value of the thermistor element measured in the first step and the target resistance value (i.e., a change in the resistance value before and after adjustment); a third step of determining a range of removal for the thermistor portion based on the index calculated in the second step and a correlation between the range of the portion to be removed by the removal processing, which is obtained from the above-described correlation, and the index indicating the change in the resistance value before and after adjustment; and a fourth step of performing the removal processing on the thermistor portion based on the determination made in the third step.

Embodiment (3) is a preferred example of the procedure for adjusting the resistance value of the thermistor element.

As described above, the range of the portion to be removed by the removal processing is correlated to the change in the resistance value of the thermistor element before and after adjustment. Therefore, a range of the portion to be removed by the removal processing and an index indicating the change in the resistance value before and after adjustment (e.g., a later-described resistance change rate) also have a similar correlation. Accordingly, by carrying out the above-described steps, the range of removal can be determined, and the removal processing can readily be performed.

In yet a preferred embodiment (4) of the measuring method (3) above, in measuring the resistance value of the thermistor element, the pair of electrode wires and a pair of core wires penetrating through a tubular sheath member filled with an insulating material are electrically connected to each other, and the step of measuring the resistance value comprises measuring a resistance value between end portions of the pair of core wires at a side opposite the electrode wires.

Embodiment (4) is a preferred example of the procedure for adjusting the resistance value of the thermistor element. By measuring the resistance value between the end portions (at the side opposite the thermistor portion) of the pair of core wires extending from the sheath member as described above, the work for adjusting the resistance value can be efficiently performed.

In yet another preferred embodiment (5) of the measuring method (3) above, the index is a resistance change rate ((Rt−Rs)/Rs) indicating a proportion of a difference (Rt−Rs) between a resistance value (Rs) before adjustment and the target resistance value (Rt) with respect to a resistance value (Rs) before adjustment, and the correlation is a correlation between the range of the portion to be removed by the removal processing and the resistance change rate.

Embodiment (5) is a preferred example of the index. According to research of the present inventors, etc., the range of the portion to be removed by the removal processing is correlated to the resistance change rate ((Rt−Rs)/Rs). Therefore, by using the correlation, the resistance value can readily be adjusted as described above.

In yet another preferred embodiment (6), the measuring method of any of (1) to (5) above comprises adjusting the resistance value of the thermistor element by adjusting an amount and a position of removal by the removal processing.

Embodiment (6) is a preferred example of the removal processing step. That is, the resistance value can readily be adjusted by adjusting the amount and the position of removal by the removal processing.

In yet another preferred embodiment (7), the measuring method of any of (1) to (6) above comprises adjusting the resistance value of the thermistor element by adjusting at least one of a processing position, a processing shape, and a processing depth in the removal processing.

Embodiment (7) is a preferred example of the removal processing step. Specifically, the resistance value can readily be adjusted by adjusting the processing position (which is the portion of the thermistor portion that is to be processed), the processing shape (the shape of the thermistor portion following the removal processing), or the processing depth (the depth to which the surface of the thermistor portion is removed in the case of removing the surface of the thermistor portion) in the removal processing.

In yet another preferred embodiment (8) of the manufacturing method of any of (1) to (7) above, the thermistor portion has a flat surface, and the removal processing is performed on the flat surface.

Embodiment (8) is a preferred example of the removal processing step. Specifically, when the thermistor portion has a flat surface, the resistance value can readily be adjusted by performing the removal processing on the flat surface.

In yet another preferred embodiment (9) of the manufacturing method (8) above, the thermistor portion has a plate shape, and the removal processing comprises forming a recess on at least one main surface of the thermistor portion in a plate thickness direction.

Embodiment (9) is a preferred example of the removal processing step. Specifically, when the thermistor portion has a plate shape, the resistance value can readily be adjusted by forming a recess on a main surface of the thermistor portion.

In yet another preferred embodiment (10) of the manufacturing method of any of (1) to (9) above, the removal processing comprises removing an end portion of the thermistor portion to adjust the resistance value.

The tenth embodiment is a preferred example of the removal processing step. Specifically, the resistance value can readily be adjusted by removing the end portion of the thermistor portion.

In yet another preferred embodiment (11) of the manufacturing method of any of (1) to (10) above, the removal processing comprises at least one of sandblasting, laser processing, and cutting.

The eleventh embodiment is a preferred example of the removal processing step.

In a second aspect (12), the above object of the present invention has been achieved by providing a thermistor element including: a thermistor portion which is a sintered body formed from a thermistor material; and a pair of electrode wires which are embedded in the thermistor portion and at least one end portion of each of the electrode wires projects at an outer side of the thermistor portion.

In the second aspect (12), a surface of the thermistor portion has a sintered surface and a processed surface (for resistance value adjustment, having a surface roughness different from that of the sintered surface). That is, the surface of the thermistor portion after baking has: a sintered surface formed in sintering; and a processed surface for resistance value adjustment which is formed, for example, by removal processing for adjusting a resistance value.

The resistance value of the thermistor element having such a processed surface is adjusted, for example, by removal processing, and thus the thermistor element has a desired resistance value (e.g., a target resistance value or a resistance value approaching a target value).

In addition, the resistance value of the thermistor element is adjusted after sintering the thermistor portion, and thus the configuration of the thermistor element is suitable for manufacturing (mass production) of a thermistor element having a desired resistance value.

In a preferred embodiment (13) of the thermistor element (12) above, a distance between the processed surface and an interface between the thermistor portion and the pair of the electrode wires is equal to or greater than 5 μm.

In embodiment (13), the distance between the interface and the processed surface is sufficiently large, and thus a decrease in the strength of the thermistor portion around each electrode wire can be inhibited. Accordingly, the occurrence of a problem, such as inability to carry out proper measurement of the resistance value due to breakage of the thermistor element caused by thermal shock, vibration, or the like, can be inhibited.

In another preferred embodiment (14) of the thermistor element (12) above, the thermistor portion has a flat surface, and a recess having the processed surface is formed on the flat surface.

The resistance value of the thermistor element having such a configuration can readily be adjusted, and thus the thermistor element has a desired resistance value. In addition, the configuration is more suitable for manufacturing (mass production) of the thermistor element.

In yet another preferred embodiment (15) of the thermistor element (14) above, the recess is a groove provided on the flat surface or a cutout portion of an outer peripheral portion of the flat surface.

The resistance value of the thermistor element having such a configuration can readily be adjusted, and thus the thermistor element has a desired resistance value. In addition, the configuration is more suitable for manufacturing (mass production) of the thermistor element.

In yet another preferred embodiment (16) of the thermistor element (14) or (15) above, the thermistor portion has a plate shape, and the recess having the processed surface is formed on at least one main surface of the thermistor portion in a plate thickness direction.

The resistance value of the thermistor element having such a configuration can be adjusted, and thus the thermistor element has a desired resistance value. In addition, the configuration is more suitable for manufacturing (mass production) of the thermistor element.

In yet another preferred embodiment (17) of the thermistor element of any of (12) to (16) above, the thermistor portion is composed of a single phase having electrical conductivity in a predetermined same range.

In the case where the thermistor portion is composed of a plurality of phases, there is a possibility that, for example, movement of elements occurs between a first phase and a second phase, for example, due to heat generated in the removal processing, so that the B-constant changes before and after the removal processing. Thus, in the case where the thermistor portion is composed of a single phase, the resistance value can be adjusted with high accuracy, since the B-constant does not change.

Here, the term "phase" means a crystal phase. Thus, a single phase is a crystal phase having the same crystal structure and composition.

Hereinafter, the components of the present invention will be described.

The thermistor portion is a well-known thermistor sintered body whose electric characteristic (resistance value) changes with a change in temperature. The thermistor material which is the material of the thermistor portion includes, for example, a perovskite-type oxide, a spinel-type oxide, a garnet-type oxide, and the like.

Each electrode wire is a wire having electrical conductivity. An example thereof is a wire formed from Pt, a Pt—Rh alloy, a Pt—Ir alloy, or a material in which a very small amount of an alkaline earth metal element (e.g., Sr) is added to Pt or a Pt—Rh alloy.

Each core wire is a wire having electrical conductivity. The core includes a wire formed from a stainless alloy, or the like.

The sheath member is a tubular member, and includes, for example, a metallic tube formed from a stainless alloy, or the like.

The main surface is a surface of the thermistor portion in the thickness direction.

In yet another aspect (18) of the present invention, a ratio (S2/S1) of: an area S2 of a cross-section of the thermistor element obtained by cutting the thermistor portion along a plane, which is perpendicular to a plane including center lines of the pair of electrode wires and divides a region between the center lines of the pair of electrode wires into two sections, such that at least a part of the recess is included; and an area S1 of a cross-section of the thermistor element in the case where there is no recess. The ratio (S2/S1) is a minimum value among values obtained over a range where the region between the center lines can be divided into two sections, and is equal to or greater than 0.10.

With this configuration, even in the case where at least a part of the recess is provided on the surface of the thermistor portion and at a position corresponding to the region between the center lines of the pair of electrode wires, a decrease in the strength of a portion of the thermistor portion, located between the center lines of the pair of electrode wires can be inhibited. Accordingly, this configuration can inhibit the thermistor element from being broken due to thermal shock, vibration, or the like.

The areas S1 and S2 of the cross-sections of the thermistor element are areas including the thermistor portion and the electrode wire (note that a portion of the electrode wire is embedded in the thermistor portion) when each cross-section includes a cross-section of the electrode wire.

BRIEF DESCRIPTION OF THE DRAWINGS

FIG. 4 is a graph showing the relationship between a processing depth and Rc(900) of the thermistor element of the first embodiment.

FIG. 5A is a plan view of a thermistor element of a modification of the first embodiment.

FIG. 5B is a cross-sectional view taken along the line A-A in FIG. 5A.

FIG. 12A is a plan view of a thermistor element having a cross-sectional area S1.

FIG. 12B is a cross-sectional view taken along the line C-C in FIG. 12A.

FIG. 13 is a graph showing the relationship between a processing depth and Rc(900) for Examples 8 to 11 and Examples 14 to 17.

FIG. 14A is a plan view of a thermistor element of a fifth embodiment

FIG. 14B is a cross-sectional view taken along the line D-D in FIG. 14A.

FIG. 15 is a graph showing the relationship between a processing depth and Rc(900) of the thermistor element of the fifth embodiment.

DESCRIPTION OF REFERENCE NUMERALS

Figure 1:
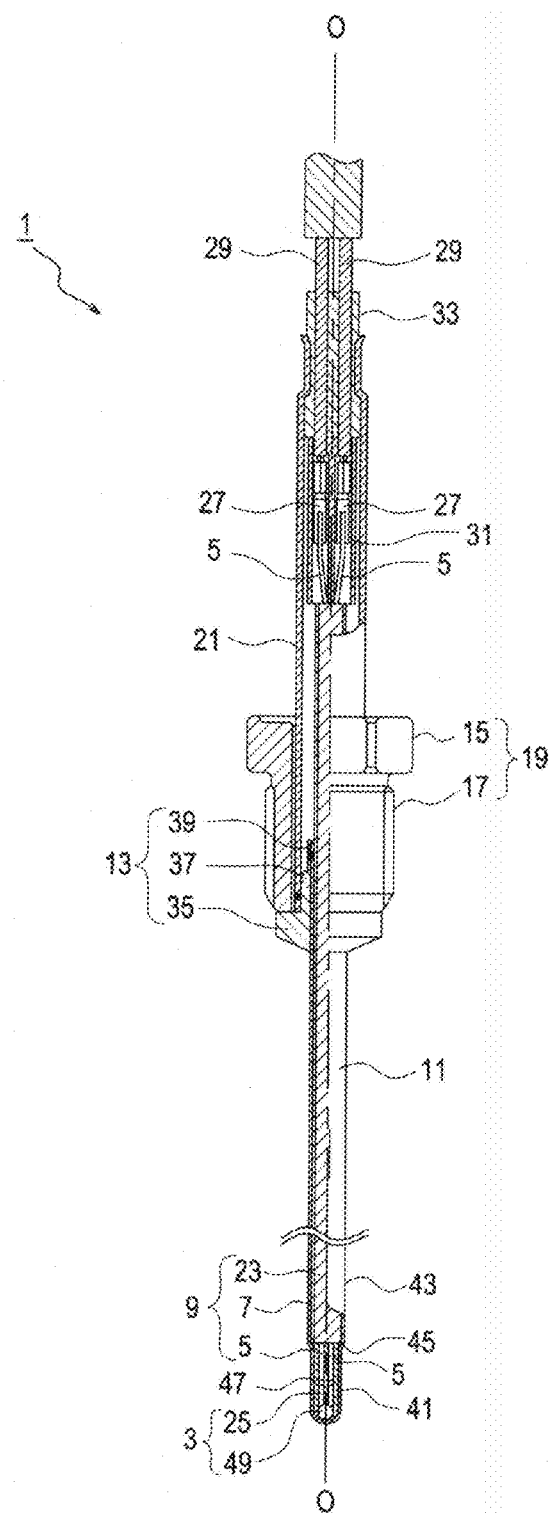
FIG. 1 is a partial cross-sectional view of a temperature sensor according to a first embodiment along an axial direction.

Reference numerals used to identify various features in the drawings include the following.

3, 61, 71, 81: thermistor element
5: sheath core wire
9: sheath member
23: insulating powder
25: electrode wire
49, 63, 73, 83: thermistor portion
49a: main surface 51, 65, 75, 85: processed portion
53, 87: processed surface
55: sintered surface

DETAILED DESCRIPTION OF THE PREFERRED EMBODIMENTS

The present invention will next be described with reference to the drawings. However, the present invention should not be construed as being limited thereto.

1. First Embodiment

First, a temperature sensor including a thermistor element of a first embodiment will be described.

1-1. Entire Configuration of Temperature Sensor

As shown in FIG. 1, a temperature sensor 1 includes: a thermistor element 3 which is a thermosensitive element; a sheath member 9 in which a pair of sheath core wires 5 made of a metal are insulated and held within a sheath tube 7; a tubular metal tube 11 which is closed at a front end side thereof and extends in an axial line O direction; an attachment member 13 which supports the metal tube 11; a nut member 19 having a hexagonal nut portion 15 and a screw portion 17; and a shell 21 which is internally fitted to a rear end side of the attachment member 13.

The axial line O direction is the longitudinal direction of the temperature sensor 1 (the direction in which an axial line O extends), and corresponds to the up-down direction in FIG. 1. In addition, a front end side in the temperature sensor 1 is the lower side in FIG. 1, and a rear end side in the temperature sensor 1 is the upper side in FIG. 1 (the same applies hereinafter).

The temperature sensor 1 is a sensor in which the thermistor element 3 for measuring a temperature is housed within the front end side of the metal tube 11. The temperature sensor 1 is installed on a flow tube such as an exhaust pipe of an internal combustion engine, and detects the temperature of a gas to be measured (exhaust gas) by the front end side of the temperature sensor 1 being disposed within the flow tube through which the gas to be measured flows.

Hereinafter, each component will be described in detail.

The sheath member 9 includes: the sheath tube 7 which is made of a metal (e.g., a stainless alloy); the pair of sheath core wires 5 which are made of a conductive metal (e.g., a stainless alloy such as SUS310S); and insulating powder 23, such as silica, which electrically insulates the sheath tube 7 and the two sheath core wires 5 from each other and holds the sheath core wires 5.

Each sheath core wire 5 is connected at the front end side thereof to an electrode wire 25, for example, by means of laser welding, and the electrode wire 25 extends from the thermistor element 3 toward the rear end side. Each sheath core wire 5 is also connected at the rear end side thereof to a crimping terminal 27, for example, by means of resistance welding. Accordingly, each sheath core wire 5 is connected at the rear end side thereof to a lead wire 29 for connecting an external circuit (e.g., an electronic control unit (ECU) of a vehicle, etc.), via the crimping terminal 27.

The pair of sheath core wires 5 and a pair of the crimping terminals 27 are insulated from each other by an insulating tube 31, and the lead wires 29 are each provided with a lead coated with an insulating coating material and are disposed so as to penetrate the interior of an auxiliary ring 33 made of a heat-resisting rubber.

The attachment member 13 has: a cylindrical projection 35 which projects radially outward; and a cylindrical rear-end-side sheath portion 37 which extends from the projection 35 toward the rear end side. The rear-end-side sheath portion 37 has a cylindrical sleeve 39 extending toward the rear end side, and the metal tube 11 is joined to the sleeve 39. That is, the attachment member 13 surrounds the outer peripheral surface of the rear end side of the metal tube 11 to support the metal tube 11.

The metal tube 11 is formed from a corrosion-resistant metal (e.g., a stainless alloy such as SU310S which is also a heat-resistant metal). The metal tube 11 is formed, by deep drawing of a steel plate, in a tubular shape which extends in the axial line O direction and in which the tube front end side is closed and the tube rear end side is open.

Figure 2:
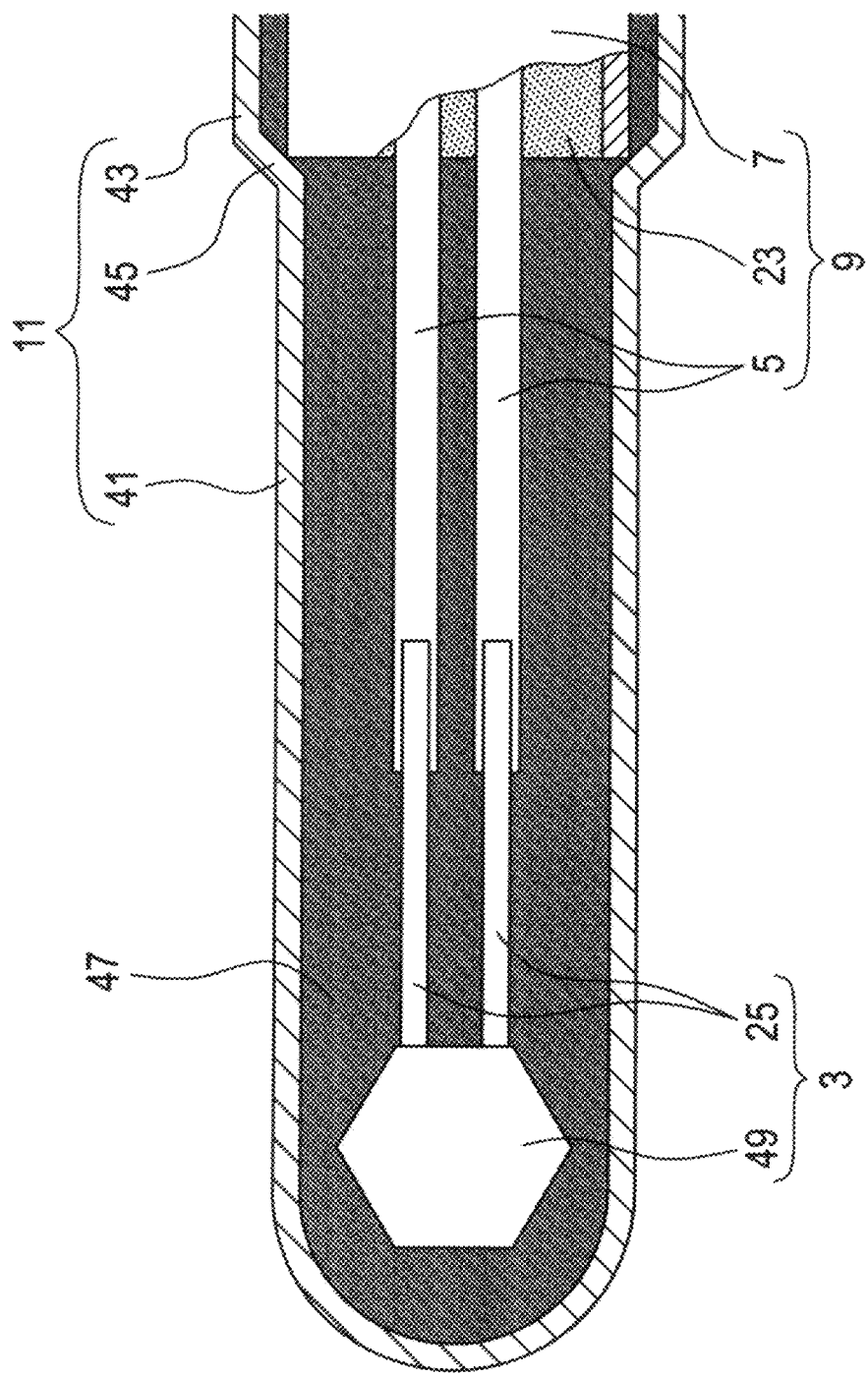
FIG. 2 is a partial cross-sectional view showing a front end side of the temperature sensor along the axial direction in an enlarged manner.

As shown in FIG. 2 in an enlarged manner, the metal tube 11 includes: a small-diameter portion 41, at the front end side, whose diameter is set to be small; a large-diameter portion 43, at the rear end side, whose diameter is set to be larger than that of the small-diameter portion 41; and a step portion 45 between the small-diameter portion 41 and the large-diameter portion 43.

The thermistor element 3 and cement 47 are housed within the metal tube 11, and the cement 47 is filled around the thermistor element 3 thereby to prevent vibration of the thermistor element 3. The cement 47 is formed from an insulating material containing an alumina aggregate in amorphous silica.

1-2. Configuration of Thermistor Element

Next, the thermistor element 3 will be described in detail.

As shown in FIG. 2, the thermistor element 3 includes: a thermistor portion 49 whose electric characteristic (electric resistance value) changes in response to temperature; and a pair of the electrode wires 25 for outputting a change in the electric characteristic of the thermistor portion 49. The thermistor portion 49 has a plate shape which is a hexagon in a plan view from the thickness direction thereof.

The pair of the electrode wires 25 are each a columnar wire made of a Pt—Rh alloy, for example. The pair of the electrode wires 25 are disposed parallel to each other, and are joined to the pair of sheath core wires 5, respectively, for example, by means of laser welding.

Regarding each dimension of the thermistor element 3, for example, one side of the regular hexagon of the thermistor portion 49 is 1.25 mm, and the thickness of the thermistor portion 49 is 0.92 mm. In addition, for example, each electrode wire 25 has a diameter of 0.30 mm, the distance between the centers of the two electrode wires 25 is 0.70 mm (the gap therebetween is 0.40 mm), and an electrode insertion amount (i.e., the length of each electrode wire 25 within the thermistor portion 49) is 1.05 mm.

The thermistor portion 49 is a ceramic sintered body having electrical conductivity, and is formed from, for example, a perovskite-type oxide having a base composition of $(Sr,Y)(Al,Mn,Fe)O_3$. That is, the thermistor portion 49 has a perovskite phase (single phase) having a perovskite structure composed of the same (single) composition.

An example of the perovskite phase is a conductive perovskite phase for which values a, b, c, d, e, and f in a composition formula $M1_aM2_bMn_cAl_dCr_eO_f$ satisfy the following conditional expressions (1) to (7).

$$0.600 \leq a < 1.000 \tag{1}$$

$$0 < b \leq 0.400 \tag{2}$$

$$0 \leq c < 0.150 \tag{3}$$

$$0.400 \leq d < 0.950 \tag{4}$$

$$0.050 < e \leq 0.600 \quad (5)$$

$$0.50 < e/(c+e) \leq 1.00 \quad (6)$$

$$2.80 \leq f \leq 3.30 \quad (7)$$

In the composition formula, M1 is at least one element of Group 3 elements other than La, which is located at a site A of the perovskite phase. M2 is at least one of Group 2 elements which is located at the site A of the perovskite phase. Preferably, M1 is composed of Nd, and M2 is composed of Ca.

The thermistor element 3 having the thermistor portion 49 which satisfies the above conditions (1) to (7) can detect a temperature in the temperature range of −40° C. to 1000° C., for example.

Figure 3A:
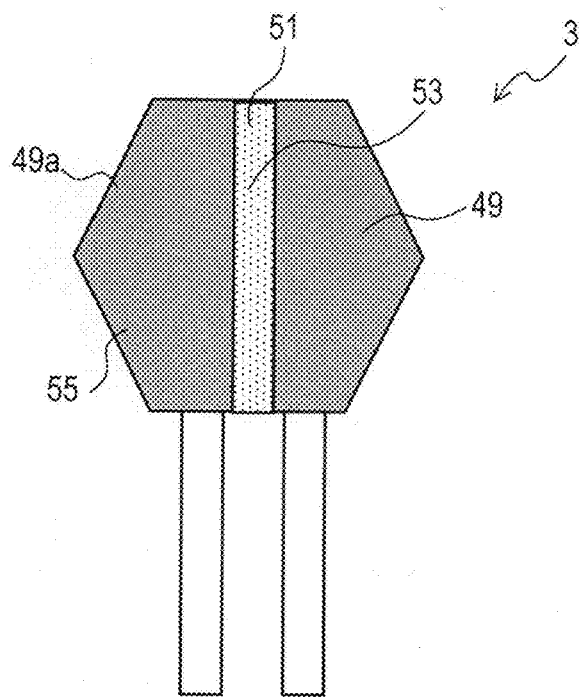
FIG. 3A is a plan view of a thermistor element of the first embodiment.
Figure 3B:
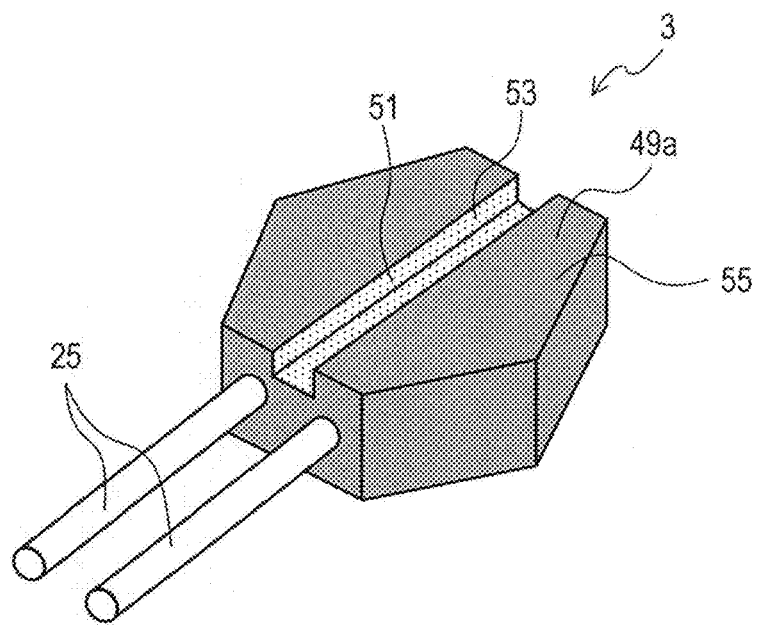
FIG. 3B is a perspective view of the thermistor element.

As shown in FIGS. 3A and 3B, in the first embodiment, the thermistor portion 49 has a processed portion 51 which is formed by removal processing described below.

Specifically, the processed portion 51 which is a recess (specifically, a groove) is formed on one main surface (first main surface) 49a of the thermistor portion 49 along the center thereof, that is, at the center in the right-left direction in FIG. 3A and parallel to the pair of electrode wires 25 (in the up-down direction in FIG. 3A).

The processed portion 51 is a cutout portion having a square column shape, and its dimensions are, for example, a length of 1.500 mm, a width of 0.300 mm, and a depth of 0.100 mm.

Among the surfaces of the thermistor portion 49, the surface of the processed portion 51 is a processed surface 53, and the surface other than the processed surface 53 is still a sintered surface (a gray portion in FIGS. 3A and 3B) 55 formed when the thermistor portion 49 is sintered. A surface roughness Ra of the sintered surface 55 is lower than a surface roughness Ra of the processed surface 53.

1-3. Manufacturing Method for Manufacturing the Thermistor Element

Next, a manufacturing method for the thermistor element 3 will be described.

Here, a manufacturing method for manufacturing the thermistor element 3 having the thermistor portion 49 composed of a composition (1) in Table 1 below, will be described. This manufacturing method is the manufacturing method used to prepare the thermistor elements of Examples 1 to 6 shown in Table 1 below.

First, a preliminarily-baked powder of a thermistor material is obtained as described below. Specifically, $Nd(OH)_3$, $CaCO_3$, $MnO_2$, $Al_2O_3$, and $Cr_2O_3$ (all are commercially available products having a purity of 99% or higher) were used as a material powder and weighed such that elements Nd, Ca, Mn, Al, and Cr had a number of moles as shown in Table 1 below.

Next, a material powder mixture of the thermistor material was prepared by wet-mixing these material powders and drying the mixture.

Next, the material powder mixture was preliminarily baked in the atmosphere at 1400° C. for 2 hours to produce a preliminarily-baked powder of the thermistor material having an average particle diameter of 1 to 2 μm.

Next, a thermistor synthetic powder was obtained as described below.

Specifically, the preliminarily-baked powder was weighed, and wet mixing and grinding was performed with ethanol as a dispersion medium using resin pots and high-purity $Al_2O_3$ spheres. Then, the thus obtained slurry was dried at 80° C. for 2 hours to produce the thermistor synthetic powder.

Next, 20 parts by weight of a binder containing polyvinyl butyral as a main component was added and mixed with respect to 100 parts by weight of the thermistor synthetic powder, and the mixture was dried. Then, the resultant product was passed through a sieve having a mesh of 250 μm and granulated to produce a granulated powder.

Next, press-forming (press pressure: 4500 $kg/cm^2$) was performed by a mold forming method using the above-described granulated powder, to produce an unbaked molded product having a hexagonal plate shape (thickness: 1.06 mm) in which one end side of each of the pair of electrode wires 25 made of a Pt—Rh alloy is embedded as shown in FIGS. 3A and 3B.

Thereafter, the unbaked molded product was baked in the atmosphere at 1500° C. to 1600° C. for 4 hours to produce the thermistor element 3 provided with the electrode wires 25 (before adjustment of the resistance value).

Then, the resistance value was adjusted as described below to thereby complete the thermistor element 3 shown in FIGS. 3A and 3B.

In addition to the thermistor element 3 having the thermistor portion 49 of the composition (1) in Table 1, thermistor elements 3 each having a thermistor portion 49 composed of a composition (2), a composition (3), or a composition (4) in Table 1 were also produced.

The composition (2) differs from the composition (1) in that the element M1 is changed to Y, the element M2 is changed to Sr, and the molar ratios a to e are different.

The composition (3) differs from the composition (1) in that the element M1 is changed to Y, the element M2 is changed to Sr, an element M3 is changed to Fe, and the molar ratios a to e are different.

The composition (4) differs from the composition (2) in that $SrAl_2O_4$ which is a second phase is included.

TABLE 1

| | First phase | | | | | | | | |
|---|---|---|---|---|---|---|---|---|---|
| | M1 a | M2 b | M3 c | Mn d | Al e | Element name M1 | Element name M2 | Element name M3 | Second phase |
| Composition (1) | 0.95 | 0.05 | 0.18 | 0.02 | 0.80 | Nd | Ca | Cr | None |
| Composition (2) | 0.9 | 0.10 | 0.02 | 0.34 | 0.64 | Y | Sr | Cr | None |
| Composition (3) | 0.84 | 0.16 | 0.13 | 0.16 | 0.71 | Y | Sr | Fe | None |
| Composition (4) | 0.9 | 0.10 | 0.02 | 0.34 | 0.64 | Y | Sr | Cr | $SrAl_2O_4$ |

1-4. Adjusting Method for Adjusting the Resistance Value of Thermistor Element

Next, an adjusting method (trimming method) for adjusting the resistance value of the thermistor element 3 will be described.

Here, examples of trimming the thermistor portion 49 of the composition (1) in Table 1 (i.e., Examples 1 to 6 in Table 2 below) and the thermistor portion 49 of the composition (4) in Table 1 (i.e., Example 7 in Table 2), will be described.

(1) First Step

First, an initial resistance value was measured for the thermistor element 3 as described below.

Specifically, first, the thermistor element 3 was left to stand in an environment of an absolute temperature T(900)=1173 K (=900° C.), and a thermistor initial resistance value Rs(900) was measured in this state using a multimeter. The result is shown in Table 2 below.

Subsequently, an initial B-constant (temperature gradient coefficient) was measured for the thermistor element 3 as described below.

Specifically, first, the thermistor element 3 was left to stand in an environment of an absolute temperature T(−40)=233 K (=−40° C.), and a thermistor initial resistance value Rs(−40) was measured in this state. Then, an initial B-constant at −40° C. to 900° C. before trimming: Bs(−40 to 900) was calculated according to the following equation (8).

$$Bs(-40 \text{ to } 900) = \ln [Rs(900)/Rs(-40)]/[1/T(900)-1/T(-40)] \quad (8)$$

(2) Second Step

Subsequently, a desired resistance change rate Rc(900) (%) was calculated by the following equation (9) from the difference between the initial resistance value Rs(900) of the thermistor element 3 and a target resistance value Rt(900) at 900° C. The result is shown in Table 2 below.

$$Rc(900)(\%) = (Rt(900)-Rs(900))/Rs(900) \times 100 \quad (9)$$

(3) Third Step

Subsequently, from a correlation between a processing depth (i.e., the depth from the main surface) and the resistance change rate Rc(900), the processing depth was calculated. The result is shown in Table 2 below.

Specifically, when a processing position (the center in the right-left direction in FIG. 3A) and a processing shape (the vertical and lateral dimensions in FIG. 3A) are the same as shown in FIGS. 3A and 3B, a processing depth at this processing position with this processing shape (i.e., the depth of the groove which is the processed portion 51) and the resistance change rate Rc(900) are correlated as shown in FIG. 4. Therefore, the processing depth was obtained from the resistance change rate Rc(900) based on the correlation.

(4) Fourth Step

Subsequently, sandblasting was performed on the surface of the thermistor portion 49 according to the determination in the third step (i.e., the processing depth), to form the processed portion 51.

Specifically, a resistance change rate Rc that achieves a target resistance value Rt was obtained, a processing depth corresponding to the resistance change rate Rc was determined, and removal processing by sandblasting was performed so as to form a processed portion 51 having the thus determined processing depth. Accordingly, the thermistor element 3 having the processed portion 51 was obtained.

Next, a resistance value Rp(900) after the processing was measured for the obtained thermistor element 3 in the same manner as described above. The result is shown in Table 2 below.

In addition, the B-constant after the processing: Bp(−40 to 900) was obtained for the thermistor element 3 in the same manner as described above. Then, a B-constant change rate Bc(−40 to 900)(%) due to the processing was calculated by the following equation (10) from the difference between the initial B-constant: Bs(−40 to 900) and the B-constant after the processing: Bp(−40 to 900).

$$Bc(-40 \text{ to } 900)(\%) = ((Bp(-40 \text{ to } 900)-Bs(-40 \text{ to } 900))/Bs(-40 \text{ to } 900)) \times 100 \quad (10)$$

These results are shown in Table 2 below.

TABLE 2

|  |  | Rt(900) | Rs(900) | Rc(900) [%] | Processing depth [mm] | Rp(900) | Bc(−40 to 900) [%] |
|---|---|---|---|---|---|---|---|
| Example 1 | Composition (1) | 0.0470 | 0.0437 | 7.55 | 0.145 | 0.0471 | −0.08 |
| Example 2 | Composition (1) | 0.0470 | 0.0442 | 6.33 | 0.129 | 0.0471 | −0.05 |
| Example 3 | Composition (1) | 0.0470 | 0.0447 | 5.15 | 0.113 | 0.0469 | −0.09 |
| Example 4 | Composition (1) | 0.0470 | 0.0453 | 3.75 | 0.091 | 0.0470 | −0.04 |
| Example 5 | Composition (1) | 0.0470 | 0.0461 | 1.95 | 0.056 | 0.0470 | −0.06 |
| Example 6 | Composition (1) | 0.0470 | 0.0467 | 0.64 | 0.023 | 0.0471 | −0.04 |
| Example 7 | Composition (4) | 0.0550 | 0.0532 | 3.38 | 0.084 | 0.0552 | −1.55 |

In Table 2, Examples 2 to 6 differ from Example 1 in Rs(900). In addition, Example 7 differs from Example 1 in Rs(900) and Rt(900) and in that the thermistor portion 49 had the composition (4) shown in Table 1.

As shown in Table 2, according to Examples 1 to 6, by trimming for the resistance value as described above, the resistance value Rp(900) after the processing approaches the target resistance value Rt(900), so that variations in resistance value can be greatly reduced.

Furthermore, the B-constant change rate Bc(−40 to 900) was within ±0.1% and the B-constant hardly changed before and after the processing. That is, the above-described trimming allows only the resistance value to be changed to a desired value independent of the B-constant.

Moreover, even when the composition of the thermistor portion 49 was the composition (2) or the composition (4), the same results were obtained as a result of performing the trimming of the first to fourth steps.

That is, by performing trimming for the resistance value as described above, the resistance value Rp(900) after the processing approaches the target resistance value Rt(900), so that variations in resistance value can be greatly reduced.

In the case of Example 7 in which the composition of the thermistor portion 49 is the composition (4), Bc(−40 to 900) was −1.55%, and the change in the B-constant before and after the processing was great as compared to Examples 1 to 6. The reason is thought to be that movement of elements occurred between the first phase and the second phase due to heat generated when sandblasting was performed in the fourth step. Thus, the present inventors found that the thermistor portion 49 is preferably composed of a single phase.

1-5. Advantageous Effects

In the first embodiment, the resistance value of the thermistor element 3 is adjusted by performing a removal processing of removing a part of the thermistor portion 49, which is a sintered body. Thus, even when the resistance values of individual thermistor element 3 vary, the resistance value can readily be made to approach the target resistance value.

Specifically, the resistance value of the thermistor element 3 can be adjusted, for example, by adjusting at least one of the processing position, the processing shape, and the processing depth by adjusting the amount and the position of removal by the removal processing.

Specifically, when the resistance value is adjusted, since the range of a portion to be removed by the removal processing is correlated with a change in the resistance value of the thermistor element 3 before and after adjustment, the correlation is obtained in advance. Then, a portion to be removed is set based on the correlation, and the removal processing is performed, whereby the resistance value of the thermistor element 3 can readily be adjusted to the target resistance value.

In detail, since the range of a portion to be removed by the removal processing is known to correlate to the resistance change rate $((Rt-Rs)/Rs)$, the resistance value can readily be adjusted by using this correlation.

In addition, since the thermistor portion 49 has a plate shape, the resistance value can readily be adjusted by performing removal processing in which a recess is formed on a flat surface (the main surface 49a) of the thermistor portion 49.

As described above, since it is possible to adjust the resistance value of the thermistor element 3 after baking, the variations in resistance value can be greatly reduced. Thus, a significant effect is achieved by providing a thermistor element 3 capable of detecting a temperature in a wide range with high accuracy.

1-6. Modification

A modification of the first embodiment is exemplified by a thermistor element 3 shown in FIGS. 5A and 5B.

In the thermistor element 3 of the modification, a groove-like processed portion 51 which extends in the up-down direction in FIGS. 5A and 5B and is similar to that in the first embodiment is provided on the main surface 49a of the thermistor portion 49, but this processed portion 51 does not reach both ends in the up-down direction in FIGS. 5A and 5B.

The processed portion 51 of the modification can be formed by a well-known processing method (e.g., sandblasting).

Also in the modification, the same advantageous effects as those in the first embodiment are achieved. In addition, since the processed portion 51 does not reach both ends, there is an advantage that the thermistor element 3 is further unlikely to be broken.

1-7. Correspondence Between Terms and the Embodiment

The thermistor element 3, the sheath core wires 5, the sheath member 9, the insulating powder 23, the electrode wires 25, the thermistor portion 49, the main surface 49a, the processed portion 51, the processed surface 53, and the sintered surface 55 in the first embodiment correspond to examples of a thermistor element, core wires, a sheath member, an insulating material, electrode wires, a thermistor portion, a main surface, a processed portion, a processed surface, and a sintered surface in the claims, respectively.

2. Second Embodiment

Next, a second embodiment will be described. The same description as in the first embodiment is omitted or simplified. The same components as those in the first embodiment are designated by the same reference numerals.

Figure 6:
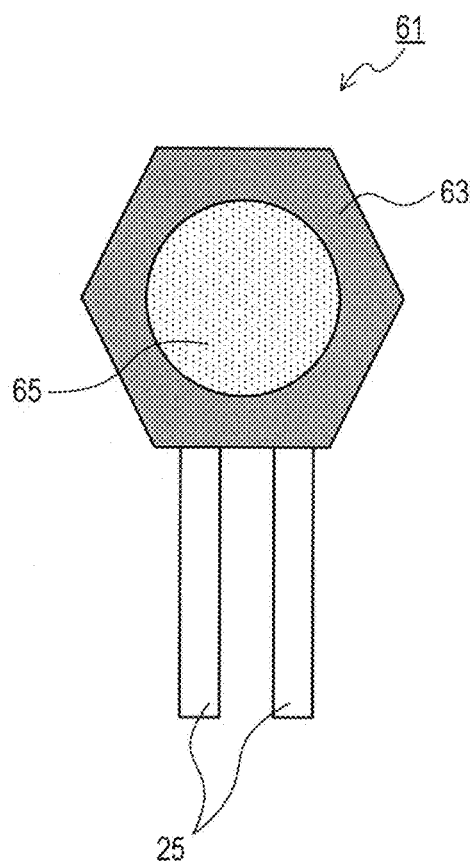
FIG. 6 is a plan view of a thermistor element of a second embodiment.

As shown in FIG. 6, similarly to the first embodiment, a thermistor element 61 of the second embodiment includes a thermistor portion 63 and a pair of electrode wires 25.

The thermistor portion 63 has a hexagonal shape in plan view, but the shape of a processed portion 65 thereof is different from that of the first embodiment.

That is, a processed portion 65 which is circular in plan view and has a diameter of 1.000 mm and a depth of 0.100 mm is formed at the center of one main surface (surface) of the thermistor portion 63. In plan view, the center of gravity of the thermistor portion 63 coincides with the center of the processed portion 65.

The thermistor element 61 of the second embodiment can also be manufactured by the same method as in the first embodiment.

Figure 7:
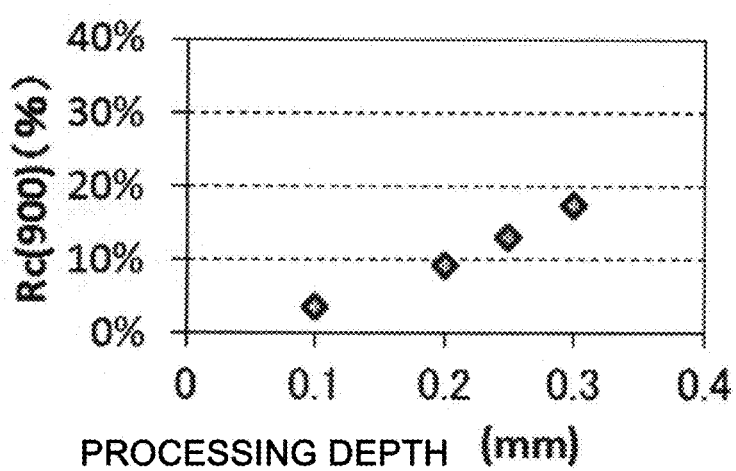
FIG. 7 is a graph showing the relationship between a processing depth and Rc(900) of the thermistor element of the second embodiment.

In the second embodiment, the correlation between the processing depth and the resistance change rate Rc(900) is shown in Table 3 below and FIG. 7.

TABLE 3

| Processing depth [mm] | Rc(900) [%] |
|---|---|
| 0.10 | 3.61 |
| 0.20 | 9.38 |
| 0.25 | 13.18 |
| 0.30 | 17.59 |

Also in the second embodiment, the same advantageous effects as those in the first embodiment are achieved.

3. Third Embodiment

Next, a third embodiment will be described. The same description as in the first embodiment is omitted or simplified. The same components as those in the first embodiment are designated by the same reference numerals.

Figure 8:
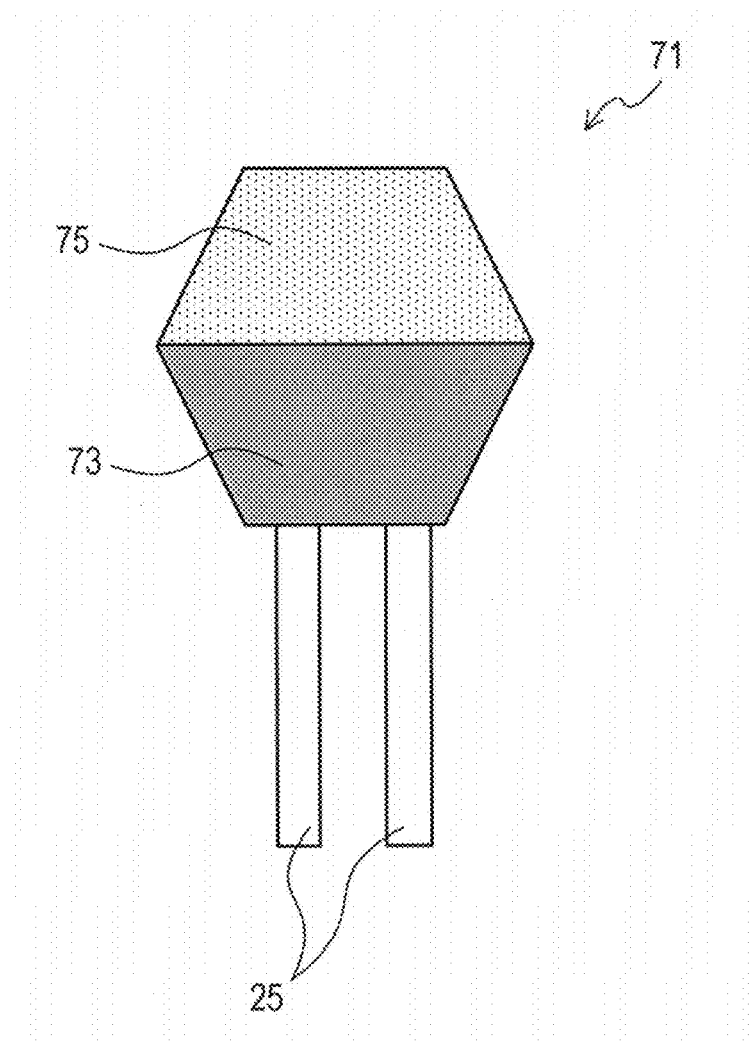
FIG. 8 is a plan view of a thermistor element of a third embodiment.

As shown in FIG. 8, similarly to the first embodiment, a thermistor element 71 of the third embodiment includes a thermistor portion 73 and a pair of electrode wires 25.

The thermistor portion 73 has a hexagonal shape in plan view, but the shape of a processed portion 75 thereof is different from that of the first embodiment.

Specifically, a processed portion 75 which is trapezoidal in plan view and has a depth of 0.100 mm is formed on one main surface (surface) of the thermistor portion 73 and at the front end side thereof (the upper side thereof in FIG. 8) from a center thereof. Here, the center is a position at which the thermistor portion 73 is equally divided into upper and lower sections that are line-symmetrical to each other in FIG. 8.

The thermistor element 71 of the third embodiment can also be manufactured by the same method as in the first embodiment.

Also in the third embodiment, the same advantageous effects as those described in reference to the first embodiment are achieved.

4. Fourth Embodiment

Next, a fourth embodiment will be described. The same description as in the first embodiment is omitted or simplified. The same components as those in the first embodiment are designated by the same reference numerals.

In the fourth embodiment, a description will be given with, as an example, a thermistor element 3 including a pair of electrode wires 25 and a thermistor portion 49 having the same configuration as in the first embodiment as shown in FIGS. 3A and 3B.

The thermistor portion 49 has the composition (1) in Table 1, and a processed portion 51 of the thermistor portion 49 has a length of 1.500 mm, a width of 0.300 mm, and a depth of 0.100 mm.

For such a thermistor element 3, trimming was performed under the conditions shown in Table 4 below, and the items identified in Table 4 were evaluated.

Specifically, for Examples 8 to 28 in Table 4 below, the processing method, the processing position, the processing shape, and the processing depth were changed, and the distance between an electrode wire interface and the processed portion, S2/S1, Bc(−40 to 900), Rc(−40), Rc(900), a breakage occurrence rate after a thermal cycle test, and the surface roughness Ra of the processed portion were examined.

Regarding Examples 8-13, 19, 20, and 22, the thermistor element 3 has a shape shown in FIGS. 3A and 3B. In addition, regarding Examples 14 to 18 and 21, the thermistor element 3 has a shape shown in FIG. 9, and the processed portion 51 and one of the electrode wires 25 overlap each other in a plan view. Furthermore, regarding Example 23, the thermistor element 3 has a shape shown in FIG. 10, and a left end portion of the processed portion 51 is located very slightly rightward from a position that overlaps a right end portion of the left electrode wire 25 in plan view.

Here, each item at the top line of Table 4 below will be described.

"Processing method" is a method for forming the processed portion 51 and includes any of sandblasting, laser processing, and cutting with a dicer, which are well known techniques.

"Processing position/shape" indicates at which position and in which shape the processed portion 51 was formed as in any of FIGS. 3A and 3B, FIG. 9, and FIG. 10. The processed portions 51 in FIGS. 9 and 10 can be formed by well-known processing methods (e.g., sandblasting) as shown in Table 4.

"Distance between processed surface and electrode wires" indicates the shortest distance between the processed portion 51 (i.e., the processed surface 53) and the interface between a ceramic portion of the thermistor portion 49 and the electrode wires 25.

Figures 11A, 11B:
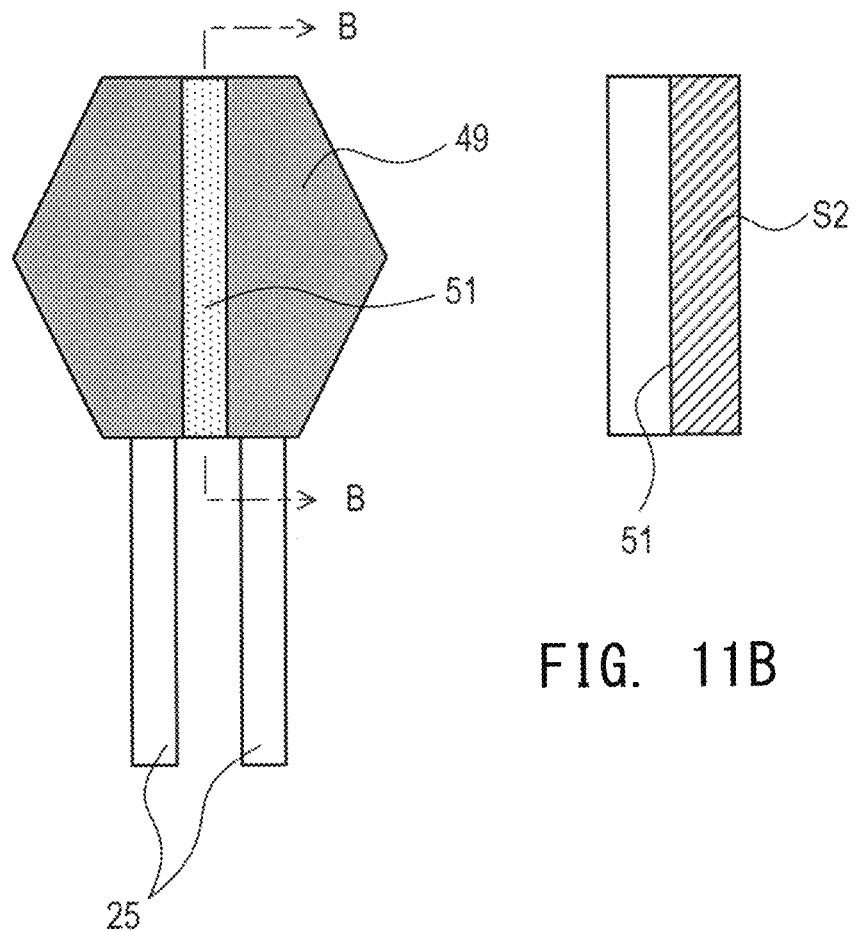
FIG. 11A is a plan view of a thermistor element having a cross-sectional area S2.
FIG. 11B is a cross-sectional view taken along the line B-B in FIG. 11A.

S2 is the area of a cross-section of the thermistor element 3 obtained by cutting the thermistor portion 49 along a plane, which is perpendicular to a plane including center lines of the pair of electrode wires 25 and divides the region between the center lines of the pair of electrode wires 25 into two sections, such that at least a part of the groove-like processed portion 51 is included, as shown in FIGS. 11A and 11B. The center lines indicate the axial center of the electrode wires 25.

In addition, S1 is the area of the cross-section (the portion at which S2 was measured) of the thermistor element 3 assuming that there is no processed portion 51 as shown in FIGS. 12A and 12B.

The areas S1 and S2 of the cross-sections of the thermistor element 3 are areas including the thermistor portion 49 and a portion of the electrode wire 25 embedded in the thermistor portion 49 when each cross-section includes a cross-section of the electrode wire 25.

The ratio (S2/S1) of the respective areas S2 and S1 is the minimum value among values obtained over a range where the region between the center lines can be divided into two sections.

"Bc(−40 to 900)(%)" is a B-constant change rate and is the same as in the first embodiment.

"Rc(−40)(%)" was obtained by the following equation (11), and is a resistance change rate indicating a proportion of the difference between the resistance value Rs(−40) before the processing and a resistance value Rp(−40) after the processing.

$$Rc(-40)(\%) = ((Rp(-40) - Rs(-40))/Rs(-40)) \times 100 \quad (11)$$

"Rc(900)(%)" was obtained by the following equation (12), and is a resistance change rate indicating a proportion of the difference between the resistance value Rs(900) before the processing and the resistance value Rp(900) after the processing.

$$Rc(900)(\%) = ((Rp(900) - Rs(900))/Rs(900)) \times 100 \quad (12)$$

"Breakage occurrence rate" indicates a breakage occurrence rate after the thermal cycle test, and was obtained as a proportion of occurrence of breakage with respect to ten samples.

In the thermal cycle test, the thermistor element 3 was taken from room temperature environment (25° C.) into an 850° C. environment and left to stand therein for 5 minutes. Next, the thermistor element 3 was returned to the room temperature environment. This operation was repeated for 5000 cycles, and then the presence/absence of breakage of the thermistor element 3 was determined.

"Ra of processed portion" indicates the surface roughness Ra of the processed portion 51, and was obtained according to the standards of JIS B0601: 2013. The surface roughness Ra of the sintered surface 55 was 1.4 μm.

These results are shown in Table 4 below and FIG. 13.

FIG. 13 is a graph for Examples 8 to 11 and Examples 14 to 17, wherein the horizontal axis indicates the processing depth and the vertical axis indicates the resistance change rate Rc(900).

TABLE 4

| | Processing method | Processing position/ shape | Processing depth [mm] | Distance between processed surface and electrode wires [mm] | S2/S1 | Bc(−40 to 900) [%] | Rc(−40) [%] | Rc(900) [%] | Breakage occurrence rate [%] | Ra of processed portion [μm] |
|---|---|---|---|---|---|---|---|---|---|---|
| Example 8 | Sandblasting | FIGS. 3A and 3B | 0.100 | 0.262 | 0.89 | −0.05 | 3.9 | 4.3 | 0 | 2.4 |
| Example 9 | Sandblasting | FIGS. 3A and 3B | 0.200 | 0.178 | 0.78 | −0.06 | 11.9 | 12.5 | 0 | 2.5 |
| Example 10 | Sandblasting | FIGS. 3A and 3B | 0.250 | 0.140 | 0.73 | −0.10 | 17.1 | 18.1 | 0 | 2.8 |

TABLE 4-continued

Figure 9:
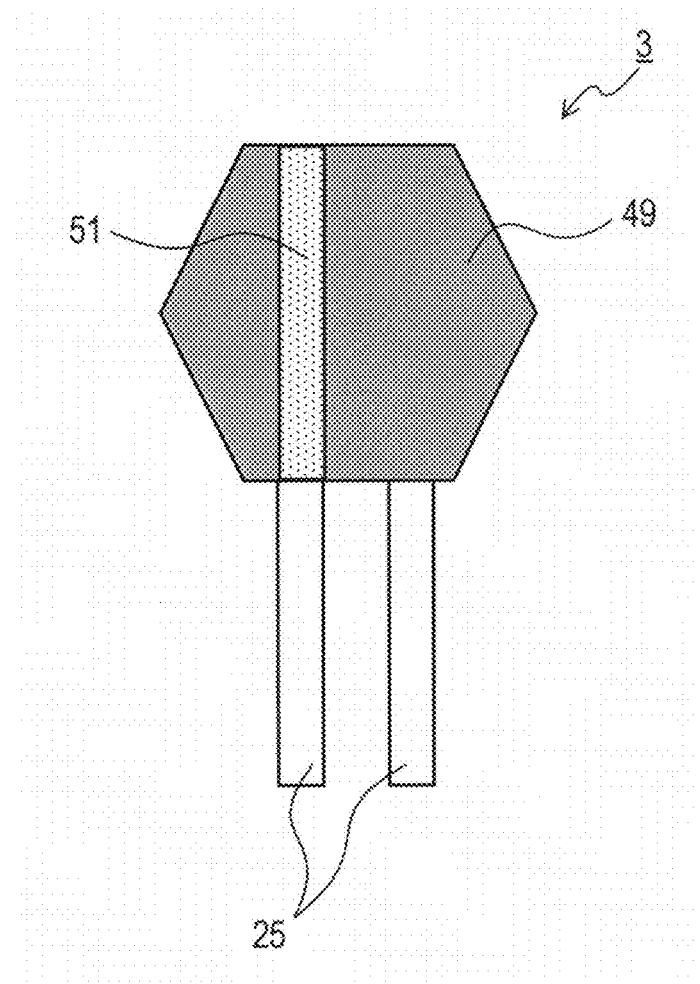
FIG. 9 is a plan view of a thermistor element of Examples 14 to 18 or 21.
Figure 10:
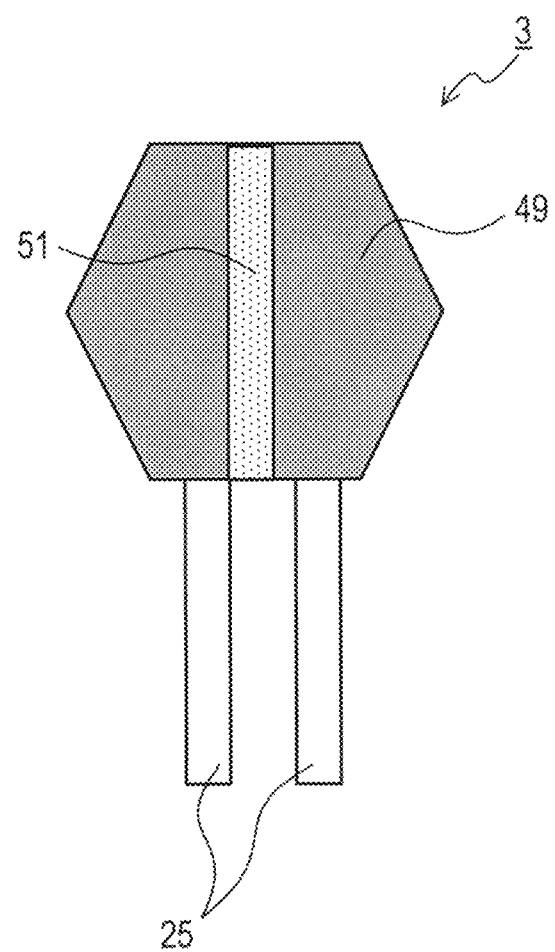
FIG. 10 is a plan view of a thermistor element of Example 23.

| | Processing method | Processing position/ shape | Processing depth [mm] | Distance between processed surface and electrode wires [mm] | S2/S1 | Bc(−40 to 900) [%] | Rc(−40) [%] | Rc(900) [%] | Breakage occurrence rate [%] | Ra of processed portion [µm] |
|---|---|---|---|---|---|---|---|---|---|---|
| Example 11 | Sandblasting | FIGS. 3A and 3B | 0.302 | 0.105 | 0.67 | −0.06 | 24.3 | 24.9 | 0 | 2.5 |
| Example 12 | Sandblasting | FIGS. 3A and 3B | 0.800 | 0.050 | 0.13 | −0.07 | 141.9 | 143.3 | 0 | 2.4 |
| Example 13 | Sandblasting | FIGS. 3A and 3B | 0.820 | 0.050 | 0.11 | −0.05 | 152.5 | 153.5 | 0 | 2.7 |
| Example 14 | Sandblasting | FIG. 9 | 0.100 | 0.210 | 0.95 | −0.09 | 3.0 | 3.9 | 0 | 2.4 |
| Example 15 | Sandblasting | FIG. 9 | 0.200 | 0.110 | 0.89 | −0.03 | 11.0 | 11.3 | 0 | 2.6 |
| Example 16 | Sandblasting | FIG. 9 | 0.250 | 0.060 | 0.86 | −0.04 | 15.9 | 16.3 | 0 | 2.5 |
| Example 17 | Sandblasting | FIG. 9 | 0.302 | 0.008 | 0.84 | −0.09 | 21.2 | 22.2 | 0 | 2.8 |
| Example 18 | Sandblasting | FIG. 9 | 0.304 | 0.006 | 0.83 | −0.05 | 21.8 | 22.3 | 0 | 2.7 |
| Example 19 | Laser processing | FIGS. 3A and 3B | 0.100 | 0.216 | 0.89 | −0.08 | 3.7 | 4.5 | 0 | 1.9 |
| Example 20 | Cutting | FIGS. 3A and 3B | 0.100 | 0.216 | 0.89 | −0.03 | 4.0 | 4.2 | 0 | 0.9 |
| Example 21 | Sandblasting | FIG. 9 | 0.306 | 0.004 | 0.83 | −0.10 | 21.2 | 22.3 | 30 | 2.6 |
| Example 22 | Sandblasting | FIGS. 3A and 3B | 0.850 | 0.050 | 0.08 | −0.10 | 158.2 | 160.5 | 10 | 2.5 |
| Example 23 | Sandblasting | FIG. 10 | 0.850 | 0.004 | 0.08 | −0.08 | 157.5 | 159.2 | 50 | 2.6 |

As shown in Table 4 and FIG. 13, the resistance change rate Rc(900) corresponding to the processing depth of the processed portion 51 obtained in Examples 8 to 13 (the processed portion 51 having the shape in FIGS. 3A and 3B) and in Examples 14 to 18 (the processed portion 51 having the shape in FIG. 9). Thus, the above results show that a desired resistance value can readily be achieved by adjusting the depth of the processed portion 51.

When Examples 8 to 13 and Examples 14 to 18 are compared, if the position of the processed portion 51 is different, the correlation between the processing depth and the resistance change rate Rc(900) is different. However, what does not change is that the resistance change rate Rc(900) corresponding to the processing depth of the processed portion 51 is achieved. Thus, the position of the processed portion 51 may be any position on the surface of the thermistor portion 49. However, the above results show that a desired resistance change rate Rc(900) can be achieved more accurately when the position of the processed portion 51 is fixed.

The comparison of Example 8 and Examples 19 and 20 shows that even when the processing method for the thermistor portion 49 is different, if the processing position, the processing shape, and the processing depth of the processed portion 51 are the same, substantially the same resistance change rate Rc(900) is achieved. Accordingly, the above results show that regardless of the processing method, the resistance change rate Rc(900) can be determined by the processing position, the processing shape, and the processing depth of the processed portion 51.

In the case of Example 21 in which the shortest distance between the processed portion 51 and the interface between the thermistor portion 49 and the electrode wires 25 is equal to or less than 4 µm, the breakage occurrence rate by the thermal cycle test is 30% which is high. On the other hand, in Examples 8 to 20 in which the distance is equal to or greater than 6 µm, the breakage occurrence rate by the thermal cycle test is 0%. Therefore, the above results show that the distance preferably exceeds 5 µm.

In the case of Example 22 in which the ratio S2/S1 of the area S2 and the area S1 is 0.08, the breakage occurrence rate by the thermal cycle test is 10% which is rather high. On the other hand, in Examples 8 to 20 in which the S2/S1 is equal to or greater than 0.1, the breakage occurrence rate by the thermal cycle test is 0%. Therefore, the above results show that the ratio S2/S1 is preferably equal to or greater than 0.1.

In Example 23, it is thought that since the distance is equal to or less than 4 µm and the S2/S1 is 0.08, the breakage occurrence rate by the thermal cycle test is 50%.

In addition, according to Examples 8 to 23, Bc(−40 to 900) is within ±0.1%, and it was found that the B-constant before and after the processing hardly changes. Accordingly, also from this aspect, the above results show that it is possible to change only the resistance value to a desired value independent of the B-constant (i.e., without changing the B-constant).

5. Fifth Embodiment

Next, a fifth embodiment will be described. The same description as in the first embodiment is omitted or simplified. The same components as those in the first embodiment are designated by the same reference numerals.

As shown in FIGS. 14A and 14B, similarly to the first embodiment, a thermistor element 81 of the fifth embodiment includes a thermistor portion 83 and a pair of electrode wires 25.

In the fifth embodiment, the shape of the thermistor portion 83 is different from that in the first embodiment.

Specifically, the thermistor portion 83 has a shape in which one end portion (an upper end portion in FIGS. 14A and 14B) of a regular hexagonal shape in plan view before the removal processing is cut out by ⅕ of the dimension in the up-down direction in FIGS. 14A and 14B. Here, a processed portion 85 is an upper end surface (processed surface 87) of the thermistor portion 83 in FIG. 15.

The thermistor portion 83 of the thermistor element 81 of the fifth embodiment can be formed, for example, by cutting and removing one end of an original hexagonal sintered body, for example, with a dicer.

In the fifth embodiment, a processing depth (d) correlates to a resistance change rate Rc(900) as shown in Table 5 below and FIG. 15. The processing depth (d) in the fifth embodiment is the length of a portion cut out from the upper end surface in FIGS. 14A and 14B.

TABLE 5

| Processing depth [mm] | Rc(900) [%] |
|---|---|
| 0.10 | 1.78 |
| 0.20 | 4.77 |
| 0.25 | 6.86 |
| 0.30 | 9.34 |

Also in the fifth embodiment, the same advantageous effects as those in the first embodiment are achieved.

6. Other Embodiments

The present invention is not limited to the above embodiments and Examples in any way, and can be carried out in various modes without departing from the scope of the present invention.

(1) For example, when laser processing or cutting is adopted as the method for removing a part of the thermistor portion in trimming, the same advantageous effects as those with sandblasting are achieved.

(2) In addition, in the removal processing, at least one of the processing position, the processing shape, and the processing depth may be adjusted. Specifically, as described above, a correlation between the contents of the removal processing and how the resistance value changes accordingly, is obtained in advance. Then, the extent to which the resistance value should be changed for achieving the target resistance value can be determined. Thus, the contents of the removal processing corresponding to the resistance value to be changed are determined based on the correlation, and the removal processing (i.e., trimming) is performed, whereby the resistance value of the thermistor element can be made to approach the target resistance value.

(3) In measuring the resistance value of the thermistor element, a measuring instrument for measuring a resistance value may be connected to the pair of electrode wires, but the pair of electrode wires may be joined and connected to the pair of sheath core wires of the sheath member. Further, the measuring instrument may be connected between the sheath core wires at the side opposite to the side of connection to the electrode wires to measure a resistance value.

In this case, when the thermistor element is heated, the measuring instrument can be connected to a position away from the position of the heating, and thus there is an advantage in that the resistance value measurement is readily made. In addition, the resistance value of the thermistor element can be made to approach the target resistance value such that the variations of individual sheath core wires are also included.

(4) The components in each embodiment described above can be combined as appropriate.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2016-080564 filed Apr. 13, 2016, incorporated herein by reference in its entirety.

What is claimed is:

1. A method for manufacturing a thermistor element, the thermistor element including: a thermistor portion which is a sintered body formed from a thermistor material; and a pair of electrode wires which are embedded in the thermistor portion and at least one end portion of each of the electrode wires projects at an outer side of the thermistor portion, the manufacturing method comprising
adjusting a resistance value of the thermistor element by performing a removal processing of removing a part of the thermistor portion,
wherein
a correlation between a range of a portion to be removed by the removal processing and a change in the resistance value of the thermistor element before and after adjustment is obtained in advance, and the resistance value of the thermistor element is adjusted to a target resistance value by performing the removal processing based on the correlation, and wherein said adjusting comprises:
a first step of measuring the resistance value of the thermistor element;
a second step of calculating an index indicating the change in the resistance value before and after adjustment, based on a difference between the resistance value of the thermistor element measured in the first step and the target resistance value;
a third step of determining a range of removal for the thermistor portion based on the index calculated in the second step and a correlation between the range of the portion to be removed by the removal processing, which is obtained from the correlation, and the index indicating the change in the resistance value before and after adjustment; and
a fourth step of performing the removal processing on the thermistor portion based on the determination made in the third step.

2. The manufacturing method as claimed in claim 1, wherein, in measuring the resistance value of the thermistor element, the pair of electrode wires and a pair of core wires penetrating through a tubular sheath member filled with an insulating material are electrically connected to each other, and the step of measuring the resistance value comprises measuring a resistance value between end portions of the pair of core wires at a side opposite the electrode wires.

3. The manufacturing method as claimed in claim 1, wherein
the index is a resistance change rate ((Rt−Rs)/Rs) indicating a proportion of a difference (Rt−Rs) between a resistance value (Rs) before adjustment and the target resistance value (Rt) with respect to a resistance value (Rs) before adjustment, and
the correlation is a correlation between the range of the portion to be removed by the removal processing and the resistance change rate.

4. The manufacturing method as claimed in claim 1, which comprises adjusting the resistance value of the thermistor element by adjusting an amount and a position of removal by the removal processing.

5. The manufacturing method as claimed in claim 1, which comprises adjusting the resistance value of the thermistor element by adjusting at least one of a processing position, a processing shape, and a processing depth in the removal processing.

6. The manufacturing method as claimed in claim 1, wherein the thermistor portion has a flat surface and the removal processing is performed on the flat surface.

7. The manufacturing method as claimed in claim 6, wherein the thermistor portion has a plate shape, and the removal processing comprises forming a recess on at least one main surface of the thermistor portion in a plate thickness direction.

8. The manufacturing method as claimed in claim 1, wherein said removal processing comprises removing an end portion of the thermistor portion to adjust the resistance value.

9. The manufacturing method as claimed in claim 1, wherein the removal processing comprises at least one of sandblasting, laser processing, and cutting.

10. A thermistor element comprising:
   a thermistor portion which is a sintered body formed from a thermistor material; and
   a pair of electrode wires which are embedded in the thermistor portion and at least one end portion of each of the electrode wires projects at an outer side of the thermistor portion, wherein
   a surface of the thermistor portion has a sintered surface and a processed surface for resistance value adjustment, the processed surface having a surface roughness different from that of the sintered surface.

11. The thermistor element as claimed in claim 10, wherein a distance between the processed surface and an interface between the thermistor portion and the pair of the electrode wires is equal to or greater than 5 μm.

12. The thermistor element as claimed in claim 10, wherein
   the thermistor portion has a flat surface, and
   a recess having the processed surface is formed on the flat surface.

13. The thermistor element as claimed in claim 12, wherein the recess is a groove provided on the flat surface or a cutout portion of an outer peripheral portion of the flat surface.

14. The thermistor element as claimed in claim 12, wherein
   the thermistor portion has a plate shape, and
   the recess having the processed surface is formed on at least one main surface of the thermistor portion in a plate thickness direction.

15. The thermistor element as claimed in claim 10, wherein the thermistor portion is composed of a single phase having electrical conductivity in a predetermined same range.

* * * * *